(12) United States Patent
Cooper et al.

(10) Patent No.: US 8,906,819 B2
(45) Date of Patent: Dec. 9, 2014

(54) METHOD FOR REMOVING CALCIUM MATERIAL FROM SUBSTRATES

(75) Inventors: Michael D. Cooper, Denver, NC (US); Nagesh Patel, Charlotte, NC (US)

(73) Assignee: Coalogix Technology Holdings Inc., Charlotte, NC (US)

( * ) Notice: Subject to any disclaimer, the term of this patent is extended or adjusted under 35 U.S.C. 154(b) by 70 days.

(21) Appl. No.: 12/650,037

(22) Filed: Dec. 30, 2009

(65) Prior Publication Data

US 2011/0160040 A1  Jun. 30, 2011

(51) Int. Cl.
| | | |
|---|---|---|
| *B01J 38/48* | (2006.01) | |
| *B01J 38/60* | (2006.01) | |
| *B01J 38/62* | (2006.01) | |
| *B01J 38/50* | (2006.01) | |
| *B01J 23/92* | (2006.01) | |
| *B01J 38/64* | (2006.01) | |
| *B01J 38/66* | (2006.01) | |
| *B01J 23/22* | (2006.01) | |
| *B01J 23/30* | (2006.01) | |

(52) U.S. Cl.
CPC *B01J 38/62* (2013.01); *B01J 23/92* (2013.01); *B01J 38/485* (2013.01); *B01J 38/64* (2013.01); *B01J 38/66* (2013.01); *B01J 23/22* (2013.01); *B01J 23/30* (2013.01)
USPC ............... 502/28; 502/22; 502/27; 502/29

(58) Field of Classification Search
CPC ............ B01J 38/62; B01J 38/64; B01J 38/66; B01J 38/485; B01J 23/22; B01J 23/30; B01J 23/92
USPC ...................................... 502/20–56
See application file for complete search history.

(56) References Cited

U.S. PATENT DOCUMENTS

| | | |
|---|---|---|
| 3,676,364 A | 7/1972 | Coates |
| 4,039,471 A | 8/1977 | McArthur |
| 7,569,506 B2 | 8/2009 | Foerster |
| 2006/0135347 A1* | 6/2006 | Schluttig et al. ................ 502/25 |
| 2006/0148639 A1* | 7/2006 | Foerster .......................... 502/27 |
| 2007/0022913 A1* | 2/2007 | Wang et al. .................... 106/697 |
| 2009/0233786 A1 | 9/2009 | Hartenstein et al. |
| 2011/0160040 A1* | 6/2011 | Cooper et al. .................. 502/28 |

FOREIGN PATENT DOCUMENTS

| | | |
|---|---|---|
| EP | 0 161 206 A2 | 3/1985 |
| WO | WO 2009/001891 A1 | 12/2008 |

OTHER PUBLICATIONS

International Search Report dated Nov. 29, 2011.

* cited by examiner

*Primary Examiner* — Jennifer A Smith
(74) *Attorney, Agent, or Firm* — Dickinson Wright PLLC

(57) ABSTRACT

This invention is directed to a method for removing calcium material from a substrate or catalytic converter. In particular, this invention is directed to a method for removing calcium material, particularly in the form of calcium-containing fly ash, from a substrate using a partially protonated or non-protonated polycarboxylic acid treatment material.

14 Claims, No Drawings

US 8,906,819 B2

METHOD FOR REMOVING CALCIUM MATERIAL FROM SUBSTRATES

FIELD OF THE INVENTION

This invention relates to a method for removing calcium material from a substrate or catalytic converter. More specifically, this invention relates to a method for removing calcium material, particularly in the form of calcium fly ash material, from a substrate using a partially protonated or non-protonated polycarboxylic acid treatment material.

BACKGROUND OF THE INVENTION

A significant portion of electrical power produced throughout the world is produced in power plants that burn a fossil fuel (e.g., coal, oil, or gas). The burning of the fossil fuel provides heat that can be used to produce steam. This steam can then be used to drive a turbine and generator to produce electricity. Upon burning the fuel, a flue gas is also formed. In some cases, the flue gas itself is directly used to drive a turbine and generator to produce electricity. However, in either case, flue gas is formed as the fossil fuel is burned. The flue gas is ultimately removed from the power plant and discharged into the atmosphere by way of an exhaust stack.

The flue gas contains contaminants such as sulfur oxides ($SO_x$), nitrogen oxides ($NO_x$), carbon monoxide (CO) and particulates of soot or ash when coal is used as the primary fuel source. The discharge of all of these contaminants into the atmosphere is subject to federal and local regulations, which greatly restrict the levels of these flue gas components.

To meet the required levels of $NO_x$ emissions, many fossil fuel-fired electric generating units incorporate the use of selective catalytic reduction (SCR) technology. In this technology, ammonia or urea based reagents are typically injected in the presence of a catalytic converter to convert the $NO_x$ to nitrogen and oxygen. The catalytic converter is typically made of a substrate and a nitrogen oxide reduction catalyst. The nitrogen oxide reduction catalyst is the catalytic material that acts to convert the $NO_x$ to nitrogen.

When coal is used as a combustion fuel, fly ash, a solid residue, is also generated and mixed with the flue gas. Additional pollution control equipment, such as hoppers, electrostatic precipitators or a bag-house is used to capture the fly ash prior to release.

Depending upon the source and makeup of the coal being burned, the components of the fly ash produced vary considerably. Fly ash typically includes varying amounts of silica (silicon dioxide, $SiO_2$) (both amorphous and crystalline), lime (calcium oxide, CaO), aluminium oxide ($Al_2O_3$), iron oxide ($Fe_2O_3$), and other types of calcium material (various calcium salts such as calcium carbonate and calcium sulfate).

Although separate equipment is used to remove the fly ash, over time the catalytic converters nevertheless become coated with a portion of the fly ash generated during combustion. Eventually, the catalytic converters become substantially reduced in their effectiveness, i.e., become deactivated, and have to be removed from service. Often, these fly ash-coated converters can be regenerated and put back in service.

Some of the methods of removing fly ash or fly ash materials from deactivated catalytic converters include treating the converters with water. Aqueous compositions that include acidic components are also used.

U.S. Patent Pub. No. 2009/0233786 discloses a method of regeneration of a SCR catalyst for use in a power plant facility burning fossil fuels, bio-based fuels, or a combination thereof, wherein poisons are removed from the catalyst. The method is suitable for use during neutralization using $C_1$ to $C_8$ carboxylic acids.

U.S. Patent Pub. No. 2006/0135347 discloses a method for the regeneration of deNOx catalysts with a reduced activity caused by the accumulation of phosphor and phosphorous compounds. The method is characterized in that the catalysts are treated with an essentially aqueous solution of water-soluble alkaline reacting alkaline earth salts, ammonium hydroxide, or alkaline reacting ammonium salts, or water-soluble organic amines with an approximate pK value ranging between 2.5 and 5.5 and that the excess alkali is neutralized by subsequent treatment with inorganic or organic acids.

U.S. Pat. No. 7,569,506 discloses a method for regenerating DeNOx catalysts having an increased $SO_2/SO_3$ conversion rate as a result of the accumulation of iron compounds, and is characterized in that the catalysts are treated with an essentially aqueous acid solution, preferably having a pH between 0.5 and 4, and with an addition of antioxidants.

U.S. Pat. No. 4,039,471 discloses a method for the rejuvenation of an automobile emission control catalyst poisoned with deposited compounds of lead and/or phosphorus is disclosed, said method comprising (a) initially extracting some of the poison compounds from the catalyst with a select aqueous ammonium or acetate salt (preferably ammonium acetate) solution; (b) exposing the catalyst to a reducing atmosphere at 300° C. to 700° C., and finally (c) removing at least a portion of the poison compounds by a second extraction with a select aqueous ammonium or acetate salt solution. Catalysts rejuvenated by the method include those comprising nickel, palladium, rhodium, platinum, or combinations thereof as active components on bases of alumina or aluminum borate.

Substrates or catalytic converters that contain calcium material deposited thereon, particularly calcium-containing fly ash material, have been found particularly difficult to clean, and ultimately, rejuvenate. Additional methods of treating substrates and rejuvenating catalytic converters are highly desired.

SUMMARY OF THE INVENTION

This invention provides an effective method of removing calcium material from substrates, including substantially deactivated catalytic converters having the calcium material deposited thereon. The method particularly enables deactivated catalytic converters to be rejuvenated to their former $NO_x$ removal activity level or to a level of enhanced $NO_x$ removal activity relative to their base condition.

According to one aspect of the invention, there is provided a method for removing calcium material from a substrate. The method includes providing a substrate containing the calcium material, and treating the provided substrate with a treatment composition to remove at least a portion of the calcium material from the substrate.

In one embodiment, the treatment composition is prepared from at least one partially protonated or non-protonated polycarboxylic acid. Preferably, the at least one partially protonated or non-protonated polycarboxylic acid has from 2 to 9 carbon atoms. More preferably, the at least one partially protonated or non-protonated polycarboxylic acid is a non-protonated dicarboxylic acid or a partially protonated tricarboxylic acid or tetracarboxylic acid. Still more preferably, the at least one partially protonated or non-protonated polycarboxylic acid is a partially protonated or non-protonated tricarboxylic acid. Yet more preferably, the partially protonated or non-protonated tricarboxylic acid is partially protonated or non-protonated citric acid, isocitric acid, aconitic acid, or propane-1,2,3-tricarboxylic acid.

In another embodiment of the invention, the treatment composition comprises a non-ionic surfactant.

In yet another embodiment, the treatment composition is prepared as a salt of the partially protonated or non-protonated polycarboxylic acid, with the salt being selected from an alkali metal, alkaline earth metal, ammonia or organic amine compound.

According to another aspect of the invention, the substrate is a catalytic converter.

According to still another aspect of the invention, there is provided a method for removing calcium fly ash material from a substrate. The substrate having the calcium fly ash material deposited thereon is treated with a treatment composition to remove at least a portion of the calcium fly ash material from the substrate, with the treatment composition comprising at least one polycarboxylic acid. The polycarboxylic acid has at least a first pKa value and a second pKa value, and the substrate is treated at an average pH above the first pKa value and the second pKa value. The treated substrate is then rinsed with an aqueous composition.

In one embodiment of the invention, the at least one polycarboxylic acid is a partially protonated or non-protonated polycarboxylic acid having a third pKa value greater than the second pKa value. Preferably, the treatment composition is prepared at a total polycarboxylic acid concentration of from 1 wt % to 10 wt %, based on total weight of the acid composition used to treat the substrate.

The methods of this invention are particularly effective in removing high calcium content material such as high calcium fly ash material. In one embodiment, the calcium fly ash material contains at least 15 wt % calcium, based on total weight of the fly ash.

In another embodiment of the invention, the substrate is treated at a pH of from 4 to 5.5.

According to yet another aspect of the invention, there is provided a method for regenerating a catalytic converter. The method includes providing a catalytic converter having calcium fly ash material deposited thereon, and treating the provided catalytic converter with an aqueous carboxylic acid solution to remove at least a portion of the calcium from the substrate. The solution is prepared from at least one partially protonated or non-protonated polycarboxylic acid, and the treated substrate is rinsed with an aqueous composition to remove at least a portion of the calcium fly ash material from the substrate. The rinsed substrate is preferably dried, and the dried substrate is impregnated with at least one $NO_x$ removal catalyst.

DETAILED DESCRIPTION OF THE INVENTION

This invention is directed to methods of removing calcium material from substrates. The method is particularly suited to removing calcium fly ash material deposited on substrates, and particularly substrates containing at least one nitrogen oxide reduction catalyst, such as catalytic converters.

According to the invention, a substantial amount of calcium material or calcium fly ash material can be removed from a substrate or catalytic converter using a treatment composition that contains, or that has been prepared from, at least one partially protonated polycarboxylic acid. The treatment composition is particularly effective in removing calcium material deposited or coated on substrate surfaces along with fly ash. Fly ash is considered a portion of the solid combustion product of coal, and the calcium material in the fly ash can be any form of calcium included in the fly ash. The higher the calcium content of coal, the higher the calcium content of the solid combustion product, i.e., the fly ash. The invention is particularly suited to removing high calcium content materials from a substrate.

Substrate

The substrate that is treated to remove the calcium material is preferably a substrate capable of supporting or having embedded therein one or more metals that act as a catalyst, particularly at least one nitrogen oxide reduction catalyst. A preferred substrate is also referred to as a catalyst support material or catalytic converter substrate material. The substrate can be of any appropriate material for supporting a catalyst. Preferred substrates are metal or ceramic substrates. Particularly preferred substrates are metal or ceramic or metal oxide substrates having plate, honeycomb, corrugated or mesh-type configuration.

Metallic substrates that can be used in accordance with this invention include may be composed of one or more metals or metal alloys. In one embodiment, the metallic substrates are employed as a mesh-type support substrate. Preferred metallic materials include heat resistant metals and metal alloys such as titanium and stainless steel as well as other alloys in which iron is a substantial or major component. Such alloys may contain one or more metals selected from the group consisting of nickel, chromium and aluminum.

In a preferred embodiment, the substrate is a metallic substrate, particularly in the form of a mesh-type support, wherein the metallic substrate material that is comprised of a metal alloy material. Preferably, the alloy material is comprised of from 3 wt % to 30 wt % chromium. In another embodiment, the alloy material is comprised of from 1 wt % to 10 wt % aluminum. In yet another embodiment, the alloy material is comprised of from 5 wt % to 50 wt % nickel, based on total weight of the metal substrate, excluding catalyst.

The alloys may also contain small or trace amounts of one or more other metals such as manganese, copper, vanadium, titanium and the like. The surface of the metal carriers may be oxidized at high temperatures, e.g., 1000° C. and higher, to improve the corrosion resistance of the alloy, such as by forming an oxide layer on the surface of the carrier. Such high temperature-induced oxidation may enhance the adherence of a refractory metal oxide support and catalyst components to the carrier.

One particular metal substrate that can be used as a substrate in a catalytic converter is an iron-chromium alloy. In one embodiment, the iron-chromium alloy is in the form of a foil, and preferably has a thickness of from about 0.02 mm to about 0.06 mm.

Ceramic substrates that can be used in accordance with this invention include any suitable metal oxide or refractory material. Examples of such materials include, but are not limited to, titania, alumina, silica, alumina-silica, zirconia, magnesium oxide, hafnium oxide, lanthanum oxide, cordierite, cordierite-alpha alumina, silicon nitride, zircon mullite, spodumene, alumina-silica magnesia, zircon silicate, sillimanite, magnesium silicates, zircon and petalite.

In one embodiment of the invention, catalytic converters that are treated according to this invention have a substrate that is of a honeycomb structure or configuration. Any suitable substrate may be employed. In one embodiment, the substrate is a monolithic substrate of the type having a plurality of parallel gas flow passages. The passages are preferably substantially straight paths that extend from their fluid inlet to their fluid outlet. The substrate material has embedded therein or deposited thereon the catalytic material, e.g., at least one $NO_x$ reduction catalyst. The flow passages are preferably thin-walled. Suitable cross-sectional shape and size of the flow passages include trapezoidal, rectangular, square, sinusoidal, hexagonal, oval, circular, etc., structure. Such structures preferably contain from about 10 to about 600 gas inlet openings (i.e., "cells") per square inch of cross section.

Calcium Material

This invention is particularly effective in removing from substrates calcium material that is in fly ash, particularly high calcium content materials. In one embodiment, the calcium material is deposited on the substrate as a result of at least a portion of the coal combustion product containing the calcium material coming into contact with the substrate. In general, the coal combustion product is a mix of a gas and solid, and the calcium material that is to be removed will be contained in at least a portion of the solid material, i.e., fly ash, that comes into contact with and is deposited on the substrate. In a particular embodiment, the substrate is a catalytic converter for converting nitrogen oxides in the combustion product to nitrogen and oxygen.

In one embodiment of the invention, the calcium material on the substrate being provided for treatment is in the form of calcium fly ash material that has been deposited on the substrate. The invention is particularly effective in removing calcium fly ash material relatively high in calcium content. In one embodiment, the substrate that is treated according to the invention has deposited thereon a calcium fly ash material from the combustion of sub-bituminous or lignite coal, which is generally high in calcium oxide content.

In one embodiment, the calcium fly ash material deposited on the substrate is from the combustion product of coal in which the non-combusted coal has a calcium oxide content of at least 1.5 wt %, based on total weight of the non-combusted coal. In another embodiment, the calcium fly ash material is from the combustion product of coal in which the non-combusted coal has a calcium oxide content of at least 2 wt %, or at least 5 wt %, or at least 10 wt %, or at least 15 wt %, based on total weight of the non-combusted coal. The calcium content of the coal (given in terms of calcium oxide) is preferably determined according to VGB Guideline, Guideline for the Testing of DENOX Catalysts, VGB-R 302 H e, $2^{nd}$ revised edition.

The invention is particularly effective in removing calcium material from a substrate having calcium fly ash material deposited thereon in which the fly ash contains at least 15 wt % calcium, based on total weight of the fly ash. The method of the invention is also effective in removing calcium fly ash material from a substrate in which the fly ash contains at least 18 wt % calcium, as well as fly ash that contains at least 20 wt % calcium, based on total weight of the fly ash on the substrate. The calcium content of the fly ash is preferably determined according to VGB Guideline, Guideline for the Testing of DENOX Catalysts, VGB-R 302 H e, $2^{nd}$ revised edition.

Treatment Composition

The treatment material that is used to treat or remove at least a portion of the calcium material is an aqueous composition that comprises a polycarboxylic acid that is in a protonated form particularly effective at removing calcium oxide from the substrate. Preferably, the polycarboxylic acid that is prepared for and included in the treatment composition is in the form of a partially protonated or non-protonated polycarboxylic acid.

According to this invention, a polycarboxylic acid is an organic compound having multiple carboxylic acid functional groups (i.e., carboxyl groups). A partially protonated polycarboxylic acid is a polycarboxylic acid having at least one protonated carboxyl group and at least one non-protonated carboxyl group. A non-protonated polycarboxylic acid is a polycarboxylic acid having substantially no protons effectively available for donation.

According to this invention protonated carboxyl group is considered a carboxyl group having a proton ion (i.e., $H^+$) available to donate. A non-protonated carboxyl group is considered a carboxyl group having no proton available to donate. Such a non-protonated group can be in its conjugate base form, or it can be in its salt form. Preferably, the salt is selected from the group consisting of alkali metals, alkaline earth metals, ammonia and amines. In one embodiment, the salt is a sodium or ammonium salt. In a preferred embodiment, the partially protonated polycarboxylic acid is a polycarboxylic having at least one protonated carboxyl group and at least two non-protonated carboxyl groups.

In one embodiment of the invention, the treatment material (i.e., aqueous polycarboxylic acid treatment solution) is prepared by preparing a partially protonated or non-protonated polycarboxylic acid composition and then mixing the partially protonated or non-protonated polycarboxylic acid with water to form an aqueous solution having a desired acid concentration. According to this invention, the concentration of any component is determined according to weight of the component added into a mixture to form the final material. For example, a concentration of 10 wt % of a component means that 10 parts by weight of the component is mixed with 90 parts by weight of all other components in the final composition to form a 10 wt % concentration of that component.

The treatment material of this invention contains an amount of partially protonated or non-protonated polycarboxylic acid effective for removing at least a majority of calcium material present on the substrate. Preferably, the treatment material contains at least 1 wt %, more preferably at least 2 wt %, still more preferably at least 3 wt %, and most preferably at least 4 wt % partially protonated or non-protonated polycarboxylic acid.

Another way of referring to the partially protonated or non-protonated polycarboxylic acid of this invention is according to its pKa value. As would be understood by one of ordinary skill in the art, the pKa value of an acid is a value representing the acid's ability to dissociate a proton from its conjugate base component. Since polycarboxylic acids have more than one conjugate base component, polycarboxylic acids have more than one pKa value. For example, a dicarboxylic acid will have 2 pKa values and a tricarboxylic acid will have 3 pKa values.

According to this invention, the polycarboxylic acid used in the treatment material will have at least 2 pKa values. In one embodiment, the composition will have a first pKa value and a second pKa value, and treatment is preferably carried out at an average pH above the first pKa value and above the second pKa value. In one embodiment, treatment is preferably out at an average pH of at least 0.1 units above that of the second pKa, with the first pKa value being less than the second pKa value. Preferably, treatment is carried out at an average pH of not greater than 1 pH unit or 2 pH units above the second pKa value.

In another embodiment, the polycarboxylic acid has at least 3 pKa values, with the third pKa value being greater than the first pKa value and greater than the second pKa value, and treatment is preferably carried out at an average pH above the first pKa value and above the second pKa value. More preferably, treatment is carried out at an average pH below the third pKa value. In one embodiment, treatment is preferably out at an average pH of at least 0.1 units above that of the second pKa value, with the first pKa value being less than the second pKa value. One example of a polycarboxylic acid having such first, second and third pKa values is citric acid. In this type of example, treatment would preferably be carried out at an average pH above the two lowest pKa values (i.e., the first pKa value and the second pKa value), and more preferably at a pH below the highest pKa value (i.e., the third pKa value).

In one embodiment of the invention, treatment of the substrate or catalytic converter with the acid composition is carried out at an average pH of from 4.6 to 6.2. In another embodiment, treatment of the substrate with the acid composition is carried out at an average pH of from 5 to 6.

The substrate or catalytic converter is treated or contacted with the treatment material for a time that removes a substantial amount, i.e., a majority, of the calcium material or fly ash from the substrate being treated. Preferably the substrate is treated or contacted with the treatment material for at least 10 minutes. More preferably, the substrate is treated or contacted with the treatment material for at least 1 hour and most preferably for at least 2 hours. Treatment can be extended for as long as desired, but it is preferred that treatment be not greater than 48 hours, more preferably not greater than 24 hours.

The substrate or catalytic converter is preferably treated or contacted with the treatment material in a vessel that is suitable for immersing the substrate or converter into the treatment material. Agitation during treatment is preferred. Either the treatment material can be agitated or the substrate or converter can be moved to cause agitation. The treatment material can be agitated by any suitable means, including by mechanical means or by flowing a fluid such as air through the treatment material.

Average temperature during treatment of the substrate or converter is preferably at least 10° C. More preferably, the average temperature during treatment of the substrate or converter is preferably from 10° C. to 90° C., more preferably from 20° C. to 80° C., and most preferably from 30° C. to 60° C.

The polycarboxylic acid of this invention is preferably a dicarboxylic acid, a tricarboxylic acid or a tetracarboxylic acid. One or any combination of more than one of any of these polycarboxylic acids can be effectively used. The polycarboxylic acids can be saturated or unsaturated. Preferably, treatment material includes a polycarboxylic acid having from 2 to 9 carbons, more preferably from 2 to 6 carbons, and most preferably from 4 to 6 carbons.

Examples of dicarboxylic acids that can be used according to this invention include, but are not limited to oxalic acid, malonic acid, tartronic acid, malic acid, succinic acid, tartaric acid, fumaric acid, maleic acid, glutaric acid, adipic acid, pimelic acid, suberic acid, azelaic acid, sebacic acid, phthalic acid, isophthalic acid, and terephthalic acid.

Examples of tricarboxylic acids that can be used according to this invention include, but are not limited to citric acid, isocitric acid, aconitic acid, propane-1,2,3-tricarboxylic acid (e.g., tricarballylic acid or carballylic acid), and trimesic acid.

Examples of tetracarboxylic acids that can be used according to this invention include, but are not limited to, pyromellitic acid, 3,3',4,4'-biphenyltetracarboxylic acid, 3,3',4,4'-benzophenonetetracarboxylic acid, 3,3',4,4'-diphenylsulfonetetracarboxylic acid, 3,3',4,4'-diphenylethertetracarboxylic acid, 2,3,3',4'-benzophenonetetracarboxylic acid, 2,3,6,7-naphthalenetetracarboxylic acid, 1,2,5,6-naphthalenetetracarboxylic acid, 3,3',4,4'-diphenylmethanetetracarboxylic acid, 2,2-bis(3,4-dicarboxyphenyl)propane, 2,2-bis(3,4-dicarboxyphenyl)hexafluoropropane, 3,4,9,10-tetracarboxyperylene, 2,2-bis[4-(3,4-dicarboxyphenoxy)phenyl]propane, 2,2-bis[4-(3,4-dicarboxyphenoxy)phenyl]hexafluoropropane, butanetetracarboxylic acid, and cyclopentanetetracarboxylic acid.

Surfactant

The treatment material used according to this invention can further comprise, in an alternative embodiment, at least one surfactant. A surfactant (i.e., surface-active agent) is considered to be any compound that reduces surface tension when dissolved in water or water solutions, or that reduces interfacial tension between two liquids, or between a liquid and a solid. Preferably, the substrate treatment material further includes at least 0.01 wt % surfactant, more preferably at least 0.05 wt % surfactant, based on total weight of the treatment material. It is also preferred that the treatment material contain not greater than 0.5 wt %, more preferably not greater than 0.2 wt % surfactant, based on total weight of the treatment material.

The surfactant can be any suitable anionic, cationic, zwitterionic or non-ionic surfactant. Non-ionic surfactants are preferred, particularly when the substrate being treated is a catalytic converter, as non-ionic surfactants will be sufficiently devoid of ions that could be considered as deactivators of catalytic components on the catalytic converter. Non-limiting examples of non-ionic surfactants include, but are not limited to, alkyl alkoxylates, alkylesters, polyoxyethylene alkanols, aliphatic acid esters of polyhydric alcohols, polyoxyethylene monoalkyl ethers, polyoxyethylene diols, siloxane type surfactants and alkylene glycol monoalkyl ethers.

Ultrasonic Treatment, Drying, Impregnation

Following treatment with the treatment composition, the substrate or converter is preferably rinsed with an aqueous composition to further remove at least a portion of the calcium material. Rinsing can be accomplished by any practical means. Examples of rinsing include, but are not limited to, spraying, immersion, or a combination of methods.

The aqueous composition used for rinsing is preferably comprised of at least 50 wt % water. More preferably, the aqueous rinsing composition is distilled water, de-ionized water, or tap water.

In one embodiment of the invention, fly ash and large particles of contaminants on the surface of the substrate being treated are physically removed from the substrate or converter prior to treating with the treatment composition. This physical removal of fly ash and contaminants can be accomplished, for example, by moving a stream of pressurized vapor, e.g., air, across or through the substrate or converter to loosen or dislodge material that has collected on the substrate or converter. In one particular example, an air gun (e.g., 50-100 psi) is used as a source of pressurized air. A vacuum device can be used to collect loose or dislodged particles. Total time for dislodging particles from the substrate or converter depends on the size of the substrate or converter, but is typically from 5 to 60 minutes.

Removal of the calcium material can be enhanced by ultrasonic treatment. Ultrasonic treatment takes place by exposing the treatment composition used to treat the substrate or converter to ultrasonic sound. The composition to which ultrasonic sound is applied can be any of the polycarboxylic acid compositions described herein. Preferably, ultrasonic treatment or exposure to ultrasonic sound is applied during treatment, during rinsing, or both.

In one embodiment, the substrate or catalytic converter is exposed to a high-frequency ultrasonic vibration, with a simultaneous flow of treatment composition across the substrate or converter. The intensity of the ultrasound can be regulated and adapted to the degree of soiling. Preferably, ultrasonic sound is applied in the range of from about 15 kHz per 5 watts per liter of aqueous composition to about 40 kHz per 5 watts per liter of aqueous composition, more preferably from about 18 kHz per 5 watts per liter of aqueous composition to about 30 kHz per 5 watts per liter of aqueous composition.

After rinsing, the substrate or converter is dried. Drying can be accomplished by an suitable means. Preferably the substrate or converter is dried in air. More preferably, the rinsed substrate or converter is dried by passing air across the substrate or converter. The air that is used for drying is preferably at a temperature of from 20° C. to 400° C., more preferably from 100° C. to 300° C.

Once the substrate or converter is dried, the substrate or converter can be impregnated with at least one $NO_x$ removal catalyst. This impregnation can be used to return the substrate or converter to its former $NO_x$ removal activity or to enhance $NO_x$ removal activity from any baseline condition. The substrate or converter can be impregnated with one or more $NO_x$ reduction catalyst metals selected from the group consisting of Group 4, 5 and 6 metals. In one embodiment, the substrate or catalytic converter is impregnated with vanadium or tungsten so that the active component is supported on or embedded in the substrate or converter.

As one example of impregnating the substrate or catalytic converter with vanadium, it may be soaked in an aqueous solution prepared by dissolving a vanadium compound (e.g., vanadium oxalate, ammonium metavanadate or vanadyl sulfate) in water, an organic acid, or an amine solution. As one example, a phosphoric acid treated catalyst is placed in a solution of vanadium oxylate which contains from 0.1 wt. % to 4 wt. % vanadium in the form of vanadium pentoxide for a period of from 1 minute to 60 minutes, preferably from 2 minutes to 20 minutes. Following vanadium impregnation, the substrate or catalytic converter is heat treated in a drying oven to a final temperature of at least 150° C., preferably at least 200° C. The actual amount of vanadium taken up by the substrate or catalytic converter in the impregnation process is measured by x-ray fluorescence spectroscopy. In one embodiment, the impregnated substrate or catalytic converter contains about 1% by weight to about 3% by weight of $V_2O_5$, based on total weight of the impregnated substrate or catalytic converter.

As one example of impregnating the substrate or catalytic converter with tungsten, it may be soaked in an aqueous solution prepared by dissolving a tungsten compound (e.g., ammonium-tungstate or tungsten chloride) in water, hydrochloric acid, an amine solution or an organic acid. In one embodiment, tungsten is impregnated in combination with vanadium. This can be accomplished in a single step or in separate steps.

As one example of tungsten and vanadium impregnation, chemically compatible forms of tungsten and vanadium, such as ammonium vanadate and ammonium para-tungstate, are combined in a single solution containing from 0.5% to 3% vanadium in the ammonium vanadate solution (measured as $V_2O_5$), and from 3% to 8% tungsten in the ammonium para-tungstate solution (measured as $WO_3$). A phosphoric acid treated catalyst is exposed to this base metal containing solution for a period of from 30 seconds to 60 minutes, preferably from 2 minutes to 20 minutes, and then heat treated in a drying oven to a final temperature of at least 150° C., preferably at least 200° C.

In one embodiment, tungsten is impregnated as ammonium para-tungstate, and the substrate or catalytic converter is preferably heat treated in a calcining furnace to convert ammonium para-tungstate to its catalytically useful oxide form, $WO_3$, preferably at least 500° C., more preferably 600° C.

Following heat treatment and calcinations, the concentrations of vanadium and tungsten are measured by x-ray fluorscense spectroscopy. Desirable concentrations of these metals would be from 0.5 wt % vanadium pentoxide and 2 wt % to 9 wt % tungsten trioxide, based on total weight of the impregnated substrate or catalytic converter.

EXAMPLE

The invention will be further clarified by the following Example.

Partially protonated citric acid was prepared by adding 2 equivalents —OH, in the form of NaOH (alternatively $NH_4OH$ can be used). The determination that the correct amount of —OH equivalents had been added was done by monitoring pH; when sufficient base had been added to the citric acid solution that the pH reached ~4.8 the solution was ready for use. The second pK for citric acid is 4.77. The partially protonated citric acid was mixed with water to produce a final composition having an acid concentration in the range of from 3 wt % to 5 wt %. A surfactant was also mixed with the water and acid to produce a final composition having a surfactant composition in the range of from 0.1 wt % to 0.2 wt %.

A honeycomb catalyst containing high calcium fly ash material was immersed in the final treatment composition and the treatment composition was maintained at a temperature in the range of 45° C. to 55° C. for approximately 15 hours. The solution was subjected to vigorous circulation over the course of the treatment. The catalyst module in this example consisted of 72 separate honeycomb catalyst elements each having 441 channels through which flue gas would normally pass to allow the desired NOx reduction reaction to occur within the catalyst. By visual inspection more than 80% of the channels in the catalyst module were plugged with hard plaster like material consisting of calcium carbonate and calcium sulfate prior to treatment. This rendered the catalyst ineffective at removing nitrogen oxides from flue gas. Following treatment with the partially protonated citric acid solution, it was found by visual inspection that less than 5% of the cells were still plugged with fly ash.

The foregoing disclosure provides illustrative embodiments of the invention and is not intended to be limiting. As understood by those of skill in the art, the overall invention, as defined by the claims, encompasses other preferred embodiments not specifically enumerated herein.

The invention claimed is:

1. A method for removing calcium fly ash material from a substrate, comprising:
   providing a substrate containing the calcium fly ash material, wherein the calcium fly ash material contains at least 10 wt % calcium oxide, based on total weight of the calcium fly ash material; and
   treating the provided substrate with a treatment composition to remove at least a portion of the calcium fly ash material from the substrate, wherein the treatment composition is comprised of at least 1 wt % partially protonated polycarboxylic acid, wherein
   i) the polycarboxylic acid is selected from the group consisting of dicarboxylic acid, tricarboxylic acid, tetracarboxylic acid, and combinations thereof,
   ii) the partially protonated polycarboxylic acid is a polycarboxylic acid having at least one protonated carboxyl group and at least one non-protonated carboxyl group, and iii) the at least one non-protonated group of the polycarboxylic acid includes a salt component selected from the group consisting of an alkali metal, ammonia and organic amine.

2. The method of claim 1, wherein the polycarboxylic acid has from 2 to 9 carbon atoms.

3. The method of claim 1, wherein the polycarboxylic acid is comprised of tricarboxylic acid.

4. The method of claim 3, wherein the tricarboxylic acid is comprised of at least one compound selected from the group consisting of citric acid, isocitric acid, aconitic acid, and propane-1,2,3-tricarboxylic acid.

5. The method of claim 1, wherein the treatment composition comprises a non-ionic surfactant.

6. The method of claim 1, wherein the substrate is a catalytic converter.

7. The method of claim 1, wherein the treatment composition is prepared at a total polycarboxylic acid concentration of from 1 wt % to 10 wt %, based on total weight of the acid composition used to treat the substrate.

8. The method of claim 1, wherein the treatment of the substrate containing the calcium fly ash material is carried out at an average pH of from 4.6 to 6.2.

9. A method for regenerating a catalytic converter, comprising:
providing a catalytic converter having calcium fly ash material deposited thereon, wherein the calcium fly ash material contains at least 10 wt % calcium oxide, based on total weight of the calcium fly ash material;
treating the provided substrate with a treatment composition to remove at least a portion of the calcium fly ash material from the substrate, wherein the treatment composition is comprised of at least 1 wt % partially protonated polycarboxylic acid, wherein
i) the polycarboxylic acid is selected from the group consisting of dicarboxylic acid, tricarboxylic acid, tetracarboxylic acid, and combinations thereof,
ii) the partially protonated polycarboxylic acid is a polycarboxylic acid having at least one protonated carboxyl group and at least one non-protonated carboxyl group, and
iii) the at least one non-protonated group of the polycarboxylic acid includes a salt component selected from the group consisting of an alkali metal, ammonia and organic amine;
rinsing the treated substrate with an aqueous composition to remove at least a portion of the calcium fly ash material from the substrate;
drying the rinsed substrate; and
impregnating the dried substrate with at least one $NO_x$ removal catalyst.

10. The method of claim 9, wherein the treatment of the substrate containing the calcium fly ash material is carried out at an average pH of from 4.6 to 6.2.

11. The method of claim 9, wherein the polycarboxylic acid has from 2 to 9 carbon atoms.

12. The method of claim 9, wherein the polycarboxylic acid is comprised of tricarboxylic acid.

13. The method of claim 12, wherein the tricarboxylic acid is comprised of at least one compound selected from the group consisting of citric acid, isocitric acid, aconitic acid, and propane-1,2,3-tricarboxylic acid.

14. The method of claim 9, wherein the treatment composition comprises a non-ionic surfactant.

* * * * *